United States Patent
Segev et al.

(10) Patent No.: US 11,095,452 B2
(45) Date of Patent: Aug. 17, 2021

(54) OUT-OF-BAND AUTHENTICATION IN GROUP COMMUNICATIONS

(71) Applicant: YISSUM RESEARCH DEVELOPMENT COMPANY OF THE HEBREW UNIVERSITY OF JERUSALEM LTD., Jerusalem (IL)

(72) Inventors: Gil Segev, Herzlyia (IL); Lior Rotem, Jerusalem (IL)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 0 days.

(21) Appl. No.: 17/047,897

(22) PCT Filed: Apr. 15, 2019

(86) PCT No.: PCT/IL2019/050427
§ 371 (c)(1),
(2) Date: Oct. 15, 2020

(87) PCT Pub. No.: WO2019/202592
PCT Pub. Date: Oct. 24, 2019

(65) Prior Publication Data
US 2021/0160078 A1    May 27, 2021

Related U.S. Application Data

(60) Provisional application No. 62/658,019, filed on Apr. 16, 2018.

(51) Int. Cl.
*H04L 9/32* (2006.01)
*H04L 29/06* (2006.01)
*H04L 12/58* (2006.01)

(52) U.S. Cl.
CPC .......... *H04L 9/3239* (2013.01); *H04L 9/3215* (2013.01); *H04L 51/12* (2013.01); *H04L 63/0428* (2013.01)

(58) Field of Classification Search
CPC .... H04L 9/3215; H04L 51/12; H04L 63/0428
(Continued)

(56) References Cited

U.S. PATENT DOCUMENTS 8,649,522 B2 * 2/2014 Dancer ................. H04L 63/045
 380/277
10,212,144 B2 * 2/2019 Guthery ................ H04L 63/126
(Continued)

FOREIGN PATENT DOCUMENTS

EP    1898577 A1    3/2008
EP    2728824 A1    5/2014

OTHER PUBLICATIONS

S. M. Bellovin et al, "An attack on the Interlock protocol when used for authentication"; IEEE Transactions on Information Theory. vol. 40(1): pp. 273-275, Jan. 1, 1994.
(Continued)

*Primary Examiner* — Amare F Tabor
(74) *Attorney, Agent, or Firm* — The Roy Gross Law Firm, LLC; Roy Gross

(57) ABSTRACT

System, method, and computer program product for authenticating a message among a groups of computing devices communicating over an unsecured channel, based on an out-of-band (OOB) authenticated channel which may be used to send a short message to all receivers.

20 Claims, 4 Drawing Sheets

(58) Field of Classification Search
USPC .......................................................... 713/168
See application file for complete search history.

(56) References Cited

U.S. PATENT DOCUMENTS

| | | | | |
|---|---|---|---|---|
| 10,356,054 | B2* | 7/2019 | Dolev | ................. H04L 45/1287 |
| 2010/0046755 | A1* | 2/2010 | Fiske | .................... H04L 9/3247 |
| | | | | 380/256 |
| 2018/0241548 | A1* | 8/2018 | Dolev | .................. H04L 9/0656 |

OTHER PUBLICATIONS

M. Bellare, et al, "Ratcheted encryption and key exchange: The security of messaging"; In Advances in Cryptology CRYPTO '17, pp. 619-650, Jun. 1, 2017.
K. Cohn-Gordon et al, "A formal security analysis of the Signal messaging protocol"; In Proceedings of the 2nd IEEE European Symposium on Security and Privacy (EuroS&P). pp. 451-466, Nov. 8, 2017.
R. Canetti et al, "Universally composable commitments"; In Advances in Cryptology—CRPYTO '01, pp. 19-40, Aug. 2, 2001.
K. Cohn-Gordon et al, "On ends-to-ends encryption: Asynchronous group messaging with strong security guarantees"; Cryptology ePrint Archive, Report 2017/666, Jul. 1, 2017.
G. D. Crescenzo et al, "Non-interactive and non-malleable commitment"; In Proceedings of the 30th Annual ACM Symposium on Theory of Computing. pp. 141-150, May 1, 1998.
G. D. Crescenzo et al, "Efficient and non-interactive non-malleable commitment"; In International Conference on the Theory and Applications of Cryptographic Techniques. pp. 40-59, Apr. 23, 2001.
M. Ciampi et al, "Four-round concurrent non-malleable commitments from one-way functions"; In Advances in Cryptology—CRYPTO '17. pp. 127-157, Jul. 29, 2017.
D. Dolev et al, "Non-malleable cryptography"; SIAM Journal on Computing. vol. 30(2)391-437, Mar. 24, 2000.
I. Damgard et al, "Non-interactive and reusable non-malleable commitment schemes"; In Proceedings of the 35th annual ACM Symposium on Theory of Computing. pp. 426-437, Jun. 16, 2003.
C. M. Ellison, "Establishing identity without certification authorities"; In Proceedings of the 6th USENIX Security Symposium. pp. 7-7, Jul. 20, 1996.
M. Fischlin et al, "Efficient non-malleable commitment schemes"; In Advances in Cryptology—CRYPTO '00. pp. 113-431, Aug. 20, 2000.
T. Frosch et al, "How secure is TextSecure?"; In Proceedings of the 1st IEEE European Symposium on Security and Privacy (EuroS &P). pp. 457-472, Mar. 21, 2016.
V. Goyal., "Constant round non-malleable protocols using one way functions"; In Proceedings of the 43rd Annual ACM Symposium on Theory of Computing. pp. 695-704; Mar. 14, 2015.
N. Kobeissi et al, "Automated verification for secure messaging protocols and their implementations: A symbolic and computational approach"; In Proceedings of the 2nd IEEE European Symposium on Security and Privacy (EuroS&P). pp. 435-450, Aug. 21, 2017.
H. Lin et al, "Constant-round non-malleable commitments from any one-way function"; In Proceedings of the 43rd annual ACM symposium on Theory of computing. pp. 705-714; Sep. 2, 2010.
H. Lin et al, "Concurrent non-malleable commitments from any one-way function"; In Proceedings of the 5th Theory of Cryptography Conference. pp. 571-588, Mar. 19, 2008.
M. Naor. "Bit commitment using pseudo-randomness"; Journal of Cryptology. vol. 4(2); pp. 151-158. Feb. 25, 2001.
M. Naor et al, "Tight bounds for unconditional authentication protocols in the manual channel and shared key models"; In Advances in Cryptology—CRYPTO'06. pp. 214-231, Aug. 1, 2006.
M. Naor et al, "Tight bounds for unconditional authentication protocols in the manual channel and shared key models"; IEEE Transactions on Information Theory. vol. 54(6); pp. 2408-2425, Jul. 1, 2008.
T. Perrin et al; "The double ratchet algorithm"; 2016. Available at https://signal.org/docs/specifications/doubleratchet/doubleratchet.pdf (accessed May 16, 2018).
R. Pass et al, "Concurrent non-malleable commitments"; In Proceedings of the 46th Annual IEEE Symposium on Foundations of Computer Science. pp. 563-572, Oct. 1, 2005.
R. Pass et al, "New and improved constructions of nonmalleable cryptographic protocols"; SIAM Journal on Computing. vol. 38(2); pp. 702-752, Jan. 1, 2008.
S. Pasini el al; "An optimal non-interactive message authentication protocol"; in Topics in Cryptology—CT-RSA '06. pp. 280-294, Feb. 13, 2006.
P. Rösler et al, "More is less: On the end-to-end security of group chats in Signal, WhatsApp, and Threema"; In Proceedings of the 3nd IEEE European Symposium on Security and Privacy (EuroS &P), Jan. 15, 2018.
R. L. Rivest et al, "How to expose an eavesdropper"; Communications of the ACM. vol. 27(4); pp. 393-395, Apr. 1, 1984.
Telegram. End-to-end encrypted voice calls—key verification. Available at https://core.telegram.org/api/end-to-end/voice-calls#key-verification (accessed May 16, 2018).
Telegram. End-to-end encryption. Available at https://core.telegram.org/api/end-to-end (accessed May 16, 2018).
S. Vaudenay, "Secure communications over insecure channels based on short authenticated strings"; In Advances in Cryptology—CRYPTO'05. pp. 309-326, Aug. 1, 2005.
Viber encryption overview. Available at https://www.viber.com/app/uploads/Viber-Encryption-Overview.pdf (accessed May 16, 2018).
WhatsApp encryption overview. Available at https://www.whatsapp.com/security/WhatsApp-Security-Whitepaper.pdf (accessed May 16, 2018). Apr. 5, 2016.
"HMAC—Wikipedia"; Available at https://en.wikipedia.org/w/index.php?title=HMAC&oldid=832688082. (accessed Mar. 27, 2018).
Menezes A J et al., "Handbook of Applied Cryptography—Chapter 9"; CRC Press. pp. 321-383, Jan. 1, 1996.
M. Bellare et al, "Random oracles are practical: A paradigm for designing efficient protocols"; In Proceedings of the 1st ACM Conference on Computer and Communications Security. pp. 62-73, Dec. 1, 1993.
PCT International Search Report for International Application No. PCT/IL2019/050427, dated Jun. 18, 2019, 4 pp.
PCT Written Opinion for International Application No. PCT/IL2019/050427, dated Jun. 18, 2019, 6 pp.
PCT International Preliminary Report on Patenability for International Application No. PCT/IL2019/050427, dated Oct. 20, 2020, 7 pp.

* cited by examiner

OUT-OF-BAND AUTHENTICATION IN GROUP COMMUNICATIONS

CROSS-REFERENCE TO RELATED APPLICATIONS

This application is a National Phase of PCT Patent Application No. PCT/IL2019/050427 having International filing date of Apr. 15, 2019, which claims the benefit of priority of U.S. Provisional Patent Application No. 62/658,019 title "OUT-OF-BAND AUTHENTICATION IN GROUP MESSAGING: COMPUTATIONAL, STATISTICAL, OPTIMAL" filed Apr. 16, 2018, the contents of which are incorporated herein by reference in their entirety.

BACKGROUND

The invention relates to the field of secure computer network communication.

Instant messaging is gaining increased popularity as a tool enabling users to communicate with other users individually or within groups. A variety of available messaging platforms, such as WhatsApp, Signal, and Telegram, hold an overall user base of more than 1.5 billion active users. These platform often recognize the need for user authentication and end-to-end encryption as key ingredients for ensuring secure communication within them.

Extensive efforts are currently put into securing messaging platforms, both commercially and academically. A key challenge in securing messaging platforms may include protecting against man-in-the-middle attacks when setting up secure end-to-end channels. Such attacks may be enabled by an inability of users to authenticate their incoming messages, e.g., given the somewhat ad-hoc nature of messaging platforms.

To this end, out-of-band (OOB) authentication protocols configured to authenticate a short value over a low-bandwidth authenticated channel, are becoming more popular in real-world scenarios, whenever there are ad hoc networks with no trusted infrastructure. In particular, this model was found suitable for initial pairing of devices in wireless networks, such as Wireless USB and Bluetooth.

A low-bandwidth authenticated channel may enable a man-on-the-middle (MTIM) attacker to view, delay, prevent delivery, insert, or even remove any message sent over the authenticated channel, without being able to modify a message's content, e.g., in an undetectable manner. In one example, a protocol may enable two users who recognize each other's voice, to mutually authenticate their public keys in an absence of a trusted infrastructure.

A majority of efforts put into securing messaging platforms have so far focused on securing user-to-user messaging, and substantially less attention has been devoted to securing group messaging. However, whereas a security of user-to-user messaging is gradually reaching a stable ground, a security of group messaging is still quite fragile and/or insufficient.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method comprising sending over a first communication channel: (i) by each of two or more receiver computing devices, to all other said receiver computing devices and to a sender computing device, an encrypted receiver bit string associated with the sending receiver computing device, (ii) by said sender computing device, to each of said receiver computing devices, an encrypted communication comprising: a sender bit string, and a message payload, (iii) by each of said receiver computing devices, to all other said receiver computing devices and to said sender computing device, a decrypted version of said receiver bit string, and (iv) by said sender computing device, to all said receiver computing devices, a decrypted version of said communication; sending over a second communication channel (v) by said sender computing device, a result of a first exclusive or (XOR) of said sender bit string and all said receiver bit strings; calculating, by each of said receiver computing devices, a result of a second XOR of said sender bit string and all said receiver bit strings; and comparing, by each of said receiver computing devices, said first and second XORs, to authenticate said message payload.

There is also provided, in an embodiment, a system comprising at least three computing device, each comprising at least one hardware processor and a non-transitory computer-readable storage medium having stored thereon program instructions, the program instructions executable by the at least one hardware processor to operate each of said at least three computing devices to: send over a first communication channel: (i) by each of two or more receiver computing devices selected from said at least three computing devices, to (a) all other said receiver computing devices, and (b) to a sender computing device selected from said at least three computing devices, an encrypted receiver bit string associated with the sending receiver computing device, (ii) by said sender computing device, to each of said receiver computing devices, an encrypted communication comprising: a sender bit string, and a message payload, (iii) by each of said receiver computing devices, to all other said receiver computing devices and to said sender computing device, a decrypted version of said receiver bit string, and (iv) by said sender computing device, to all said receiver computing devices, a decrypted version of said communication; send over a second communication channel: (v) by said sender computing device, a result of a first exclusive or (XOR) of said sender bit string and all said receiver bit strings; calculate, by each of said receiver computing devices, a result of a second XOR of said sender bit string and all said receiver bit strings; and compare, by each of said receiver computing devices, said first and second XORs, to authenticate said message payload.

There is further provided, in an embodiment, a computer program product comprising a non-transitory computer-readable storage medium having program instructions embodied therewith, the program instructions executable by at least one hardware processor to operate each of at least three computing device to send over a first communication channel: (i) by each of two or more receiver computing devices selected from said at least three computing devices, to (a) all other said receiver computing devices, and (b) to a sender computing device selected from said at least three computing devices, an encrypted receiver bit string associated with the sending receiver computing device, (ii) by said sender computing device, to each of said receiver computing devices, an encrypted communication comprising: a sender bit string, and a message payload, (iii) by each of said receiver computing devices, to all other said receiver computing devices and to said sender computing device, a decrypted version of said receiver bit string, and (iv) by said sender computing device, to all said receiver computing devices, a decrypted version of said communication; send over a second communication channel: (v) by said sender computing device, a result of a first exclusive or (XOR) of said sender bit string and all said receiver bit strings; calculate, by each of said receiver computing devices, a result of a second XOR of said sender bit string and all said receiver bit strings; and compare, by each of said receiver computing devices, said first and second XORs, to authenticate said message payload.

In some embodiments, said authenticating comprises verifying that said message payload was not modified during said sending of said encrypted communication by said sender computing device over said first communication channel.

In some embodiments, said at least some of said sender bit string and receiver bit strings are randomly generated bit strings.

In some embodiments, said encryption is performed using a cryptographic hash function.

In some embodiments, said second communication channel is an authenticated channel.

In some embodiments, said second communication channel is one of a voice channel, a data channel, a visual channel, and an auditory channel.

In some embodiments, said second communication channel is a unidirectional channel only between said sender device and each of said receiver devices.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
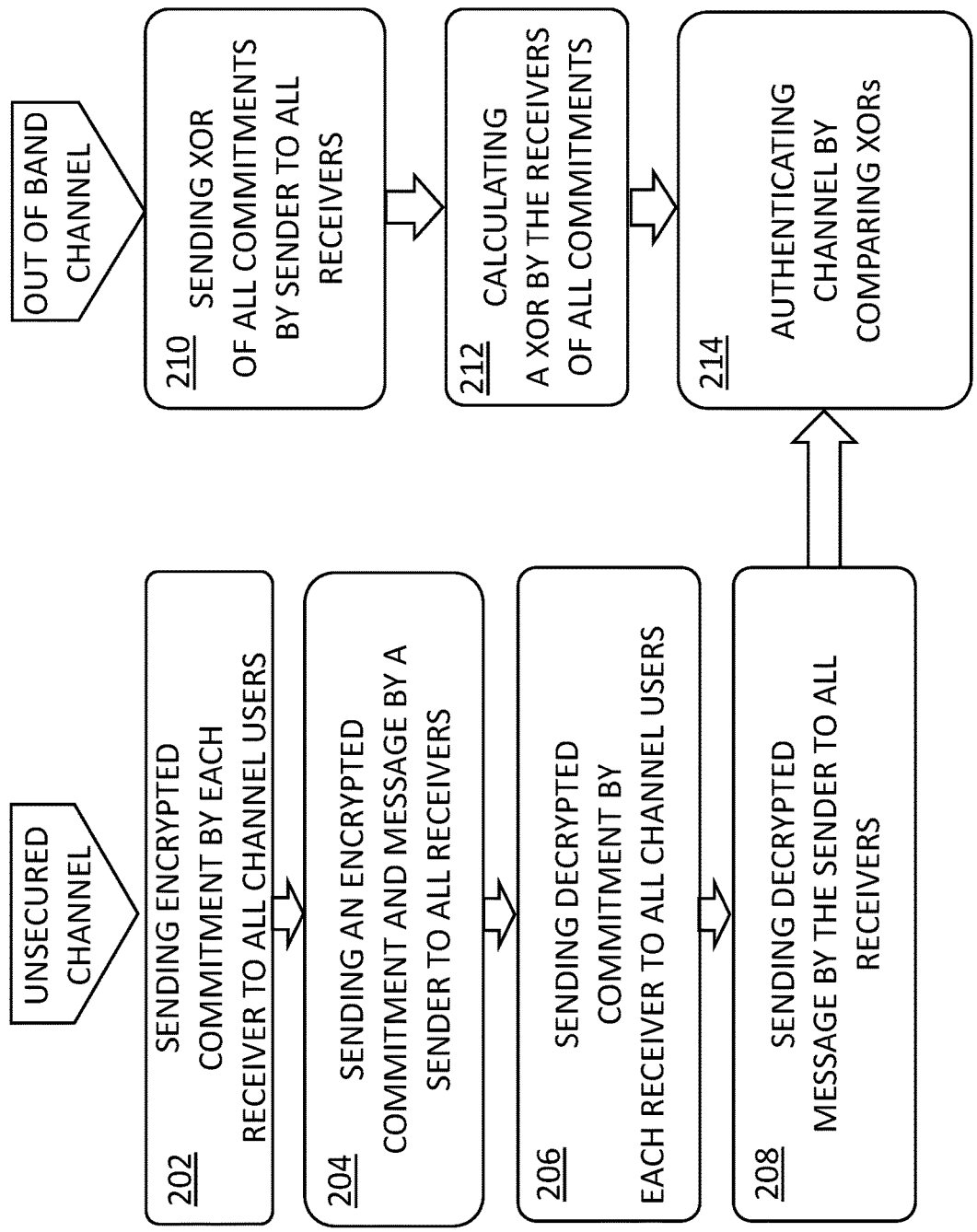
FIG. 1 is a flowchart illustrating functional steps in a group messaging authentication protocol, according to an embodiment of the present invention.

Described herein are systems, methods, and computer program products for authenticating a message communicated between a plurality of computing devices over a communication channel, referred to as an "in-band" channel.

In some embodiments, an authentication protocol of the present disclosure may provide for a practical and efficient way to authenticate a group message over a communication channel assumed to be unsecured, using a provided second communication channel, referred to as an "out-of-band" (OOB) channel.

In some embodiments, the OOB channel may be an authenticated channel. In some embodiments, the OOB channel may comprise a low bandwidth channel which permits sending of short and/or relatively simple authentication message among the group of computing device. In some embodiments, the present authentication protocol may enable users of a group to authenticate their public keys, or more generally, authenticate the transcript of any group key-exchange protocol of their choice.

In some embodiments, the present authentication protocol provides for an optimal tradeoff between a length and/or complexity of an authentication message, and a risk of success of a man-in-the-middle (MTIM) attack by an attacker, assuming computational limitations of the attacker.

In some embodiments, the present authentication protocol may provide for security that holds even when the attacker is computationally unbounded.

As noted above, a key challenge in securing messaging platforms is that of protecting against MTIM attacks when setting up secure end-to-end channels. Such attacks are enabled by the inability of users to authenticate their incoming messages given the somewhat ad-hoc nature of messaging platforms. To this end, various messaging platforms enable "out-of-band" authentication, assuming that users have access to an external channel for authenticating short values. These values typically correspond to short hash values that are derived, for example, from the public keys of the users, or more generally from the transcript of any key-exchange protocol that the users execute for setting up a secure end-to-end channel.

For example, in a user-to-user setting, some messaging platforms offer users the ability to compare with each other a value that is displayed by their devices. This may rely on the realistic assumption that by recognizing each other's voice, two users can establish a low-bandwidth authenticated channel: An MTIM attacker can view, delay or even remove any message sent over this channel, but cannot modify its content in an undetectable manner. However, similar authentication protocols for group messaging have not been implemented.

Accordingly, in some embodiments, the present disclosure extends a user-to-user authentication protocol to consider a group of users that may consist, e.g., of a sender (e.g., the group administrator) and multiple receivers (e.g., all other group members). In some embodiments, all users communicate over an unsecured channel, wherein there is available to the sender an out-of-band (OOB) authenticated channel which may be used to send, e.g., a short message to all receivers. The OOB channel may be based, for example, on the assumption that each user within the group can identify the sender's voice. In some embodiments, other OOB verification methods, based, e.g., in data, auditory, or visual verification, may be used. In some embodiments, the OOB channel may be visible to an MTIM attacker, i.e., the attacker may be able to read, block, delay, or entirely remove any messages sent over the OOB channel for some or all receivers, however, the attacker cannot modify any message in an undetectable manner.

A potential advantage of the present disclosure is, therefore, in that it provides for a simple and efficient authentication protocol of a group message over a communication channel in a group setting, while ensuring an optimal tradeoff between a length of the authenticated value and an attacker's success probability.

In some embodiments, references to a 'man-in-the-middle' (MTIM) attack may refer to an attacker, e.g., a hacker, who attempts to relay and possibly alters a communication between parties who may believe they are directly communicating with each other. In one example, a MITM attacker makes independent connections with each user and relays messages between them to make them believe they are talking directly to each other, when in fact the entire conversation is controlled by the attacker.

In some embodiments, references to an 'unsecured' channel may refer to a channel in which an attacker, e.g., using an MTIM attack, is able to intercept, read, delay, stop, modify, add, and/or alter any message sent over the unsecured channel.

In some embodiments, 'authentication' may refer to the act of confirming the truth of an attribute of a piece of data claimed true by an entity. In some embodiments, authentication may comprise confirming the identity of a sender, e.g., that the message was sent by a specified person and not by an impostor purporting to be that person.

In some embodiments, references to an 'out-of-band' (OOB) and/or 'auxiliary' channels and/or authentication may refer to authenticating a transmission (e.g., a string of bits) via a secondary verification method, e.g., through a separate authentication channel, for example, a voice medium, a visual medium, a data channel, a biometric medium, and/or any other medium. The authenticating may be performed by, e.g., typing, voicing, viewing, and/or transmitting a specified value over the separate authenticated channel.

In some embodiments, the group messaging authentication protocol may be based on a user-to-user protocol, e.g., as described below.

In some embodiments, a user-to-user message authentication problem may include, e.g., a situation in which a message sender and a message receiver are connected by a bidirectional unsecured channel, and by a unidirectional low-bandwidth auxiliary channel (also referred to as a manual and/or out-of-band channel), but do not share any secret information and/or keys. In some cases, the attacker and/or hacker may have full control over the unsecured channel.

In some embodiments, messaging platforms in which users have access to an external low-bandwidth, e.g., OOB, channel, may utilize a user-to-user "out-of-band" setting, e.g., configured to authenticate a message between two users.

A low-bandwidth OOB and/or auxiliary authenticated channel may enable a sender to manually authenticate at least one short string and/or value to a receiver, for example, by typing a short string and/or value, or by comparing two short strings and/or values. The attacker may not be able to modify the short string over the authenticated channel, but she may still be able to read it, delay it, and/or remove it.

In one example, the user-to-user setting may be implemented by a user comparing two short strings displayed by two devices, for example, via a visual channel, an audio channel, and/or any other OOB channel.

In some embodiments, the short strings and/or values may correspond to short hash values, e.g., which may be derived, for example, from a transcript of any key-exchange protocol that users may execute and/or implement for setting up a secure end-to-end channel, e.g., public encryption keys of users.

For example, an OOB and/or auxiliary channel may enable two users, who recognize each other's voice, to mutually authenticate their public encryption keys in absence of trusted infrastructure, e.g., via a voice medium.

In some embodiments, since an authenticated, e.g., OOB, channel may have a low bandwidth, the user-to-user setting may be required to optimize a tradeoff between a length of an OOB authenticated value, e.g., which optimally may be as short as possible, and an attacker's success probability, e.g., which optimally may be as low as possible. An optimal tradeoff may provide optimal computationally-secure and/or statistically-secure protocols and/or schemes.

In some embodiments, a length of a manually authenticated string may be a significant constraint. The length may be determined by an environment in which the user-to-user setting is executed, and in particular by capabilities of users. For example, while it may be reasonable to expect a user to manually authenticate 20 to 40 bits, it may not be reasonable to expect a user to manually authenticate 160 bits.

In some embodiments, the user-to-user setting may be required to provide authenticity of long messages, for example, while minimizing a length of a manually authenticated, e.g., short, hash string.

In some embodiments, the user-to-user setting may be implemented between two users, e.g., only, and may not enable a group of users to be implement a group setting.

Reference is made to FIG. 1, which is a flowchart illustrating the functional steps in a method implementing a group messaging authentication protocol, e.g., which may be configured for k receivers and one sender of a message, e.g., according to the present invention.

In some embodiments, the group messaging authentication protocol, e.g., as described herein, may be initiated when a user inputs a message to a sending computing device to be sent to a group of receiver devices.

In some embodiments, at a step 202, a plurality of receiver devices may be configured to determine each a receiver bit string, which may be a randomly-generated string of bits having a specified length. Each receiver then sends to the sender device and all other receiver devices a "commitment" message of its corresponding receiver bit string over a first communication channel. In some embodiments, each receiver device sends its commitment to the sender device, wherein the sender device in turn sends these commitments to all receiver devices.

In some embodiments, at a step 204, the sender device may determine a sender bit string, which may be a randomly-generated string of bits having a specified length. The sender device may then send to each receiver device an encrypted communication comprising (i) the sender bit string, and (ii) a message payload.

In some embodiments, at a step 206, each receiver device sends a decommitment (i.e., a decryption) of the receiver bit string to all other receiver devices and to the sender device. In some embodiments, each receiver device sends its decommitment to the sender device, wherein the sender device in turn sends these decommitments to all receiver devices. In some embodiments, the sender device then checks to verify whether the decommitment is valid. In some embodiments, if the decryptions are determined to be invalid, e.g., when they do not decrypt and/or open the plurality of first messages, computing device may be configured to determine that the message is fraudulent and/or terminate the protocol.

In some embodiments, at a step 208, the sender device sends a decommitment (i.e., a decryption) of the sender communication comprising the sender bit string and the message payload. In some embodiments, each receiver device checks to verify whether the decommitment is valid, e.g., can decrypt and/or open the encrypted communication, for example, to extract and/or reveal a value of the sender bit string and a value of the message payload from the encrypted communication. In some embodiments, the receiver devices may be configured to compare an extracted value of the message payload, e.g., which may be determined by decrypting the encrypted communication, to the non-encrypted message payload, for example, to ensure that they have a same content.

In some embodiments, if the decryptions are determined to be invalid, e.g., when they do not decrypt and/or open the plurality of first messages, computing device may be configured to determine that the message is fraudulent and/or terminate the protocol. For example, if the values are determined to be different from each other, then the receiver devices may determine that the message payload is fraudulent and/or terminate the protocol thereafter.

In some embodiments, at the conclusion of step 208, each of the sender and receiver devices possesses all (i) encrypted and decrypted bit strings of sender and all other receivers, and (ii) and encrypted and decrypted message payload.

In some embodiments, at a step 210, the sender device may be configured to send to the receiver devices a result of an exclusive or (XOR) of the sender bit string with extracted values of the plurality of receiver bit strings, for example, over a second, for example, OOB, communication channel, e.g., as described below.

In some embodiments, at a step 212, the each of the receiver devices may calculate a XOR of the decommitted (decrypted) sender bit string and the decommitted (decrypted) receiver bit strings received from each receiver.

In some embodiments, at a step 214, each receiver device may be configured to compare the sender-received XOR with the calculated XOR.

In some embodiments, a group as described above setting may involve a group of k+1 users including a sender S and k receivers $R_1, \ldots, R_k$. For each receiver i∈[k] the sender's object may be to authenticate a message $m_i$ to the ith receiver $R_i$. The users may communicate over two channels: an unsecured channel over which an MTIM attacker has complete control, and a low-bandwidth OOB authenticated channel.

Figure 2:
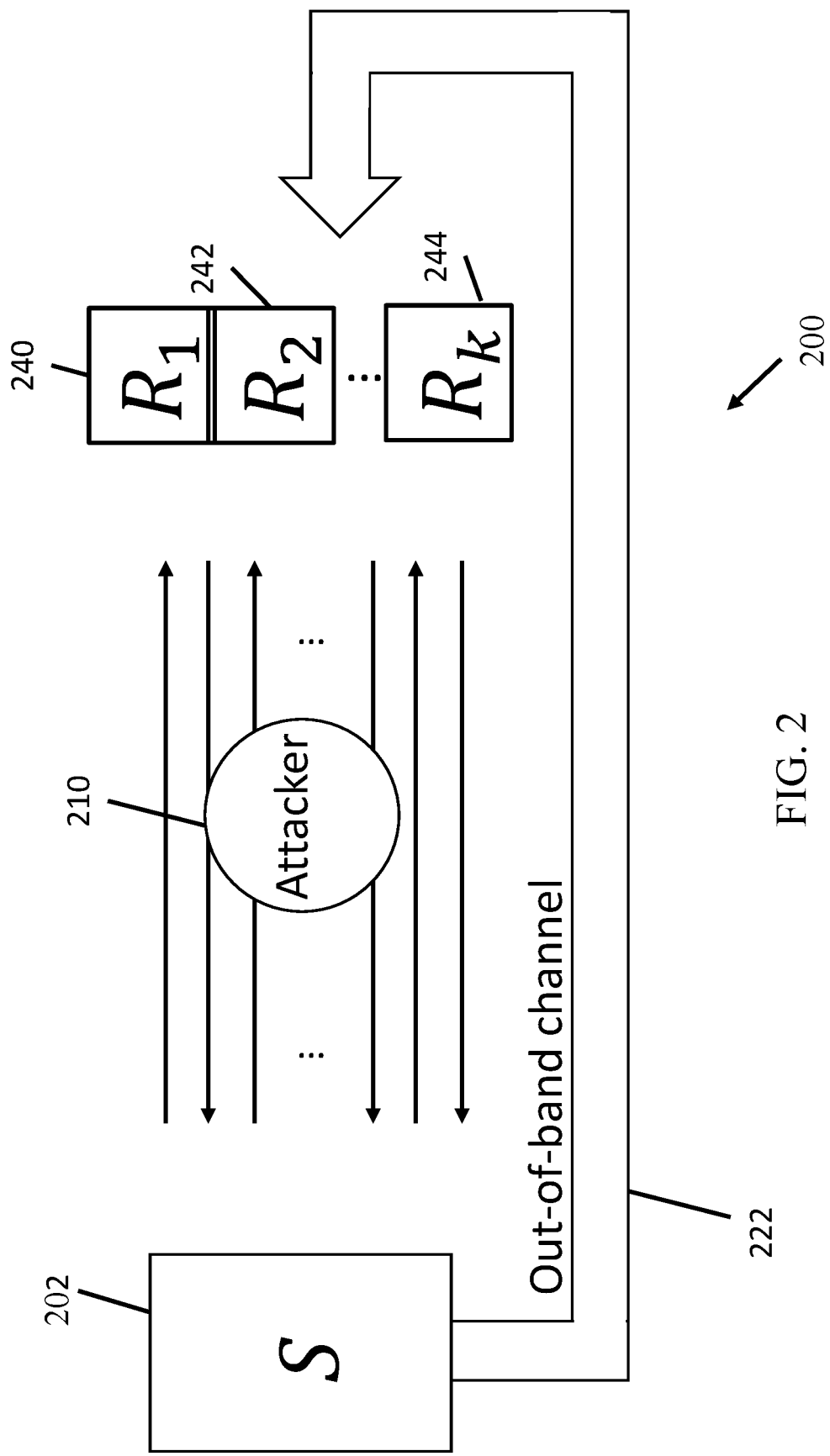
FIG. 2 shows a schematic illustration of an exemplary system, according to an embodiment of the present invention.

Reference is now made to FIG. 2, which is a schematic illustration of a group setting 300, according to the present disclosure.

As shown in FIG. 2, a sender 202 is trying to authenticate a message to k receivers which include at least receiver 240, receiver 242, and receiver 244.

Attacker 210 has full control over a first unsecured and/or unauthenticated channel over which the message may be communicated, but does not have full control over a second OOB authenticated channel 222.

In some embodiments, a group messaging authentication protocol and/or scheme configured for a group setting may be based, for example, on an assumption that each user in a group can identify the group's administrator's voice. The group messaging authentication protocol may require the group's administrator to record and/or broadcast a voice message, e.g., a short voice message, to be received by all users.

In other embodiments, group messaging authentication protocol and/or scheme may be based on any other OOB authenticated channel and/or medium.

In some embodiments, it may be assumed that an attacker and/or hacker, e.g., attacker 210, may read, delay, and/or remove any message sent over an OOB channel for some or all receivers, but is not able to modify and/or change it, e.g., at least in an undetectable manner. For example, if an attacker changes a voice message from the group's administrator and replaces it with a different message, the receiver may notice that the voice is not familiar and thus detect a fraud.

In some embodiments, users of a group may authenticate a transcript of any group key-exchange protocol of their choice, e.g., including public encryption keys.

In some embodiments, the group messaging authentication protocol may include authentication protocols and/or schemes which may be configured to achieve a best-possible and/or optimal tradeoff between a length of an OOB authenticated value and an attacker's success probability, for example, which may be advantageous and/or required at least since the OOB channel may be of low bandwidth.

In some embodiments, groups may consist of at least one group administrator, e.g., a sender, and a plurality of k receivers, for example, including all other group members.

In some embodiments, all users may communicate over at least one unsecured and/or unauthenticated channel and via at least one low-bandwidth authenticated channel, e.g., which may enable the sender to authenticate one short message to all receivers. For every receiver i∈[k] the sender may try to authenticate a message $m_i$ which may be addressed to the ith receiver.

In some embodiments, the group messaging authentication protocol may be determined and/or constructed for both a computational setting and a statistical setting.

In some embodiments, a solution for the computational setting may be implemented by a computationally-secure protocol wherein messaging security is guaranteed against computationally-bounded attackers, for example, including attackers who may have a bounded restriction on their computing capabilities.

In some embodiments, a solution for the statistical setting may be implemented by a statistically-secure protocol wherein messaging security is guaranteed against computationally-unbounded attackers, e.g., as described below.

In some embodiments, a computationally-secure protocol of the present disclosure may extent and/or enhance a first user-to-user protocol, e.g., as described below.

In some embodiments, a user-to-user protocol may include a sender S committing to and/or encrypting a value (m, $r_S$), wherein m denotes a message to be authenticated, and $r_S$ denotes a random $\ell$-bit string. A receiver R may then reply with a random string $r_R$, followed by sender S revealing $r_S$ and OOB authenticating a value of $r_S \oplus r_R$. Finally, receiver R may accept m if and only if the OOB authenticated value is consistent with his view of the protocol, e.g., if he determined a same value.

In some embodiments, when applied to the group setting, an MTIM attacker has many more possible ways to interleave its interactions with the parties than he does in the first user-to-user setting, thus making a security task more complex and/or intricate.

For instance, a naive and/or inefficient attempt to generalize the first user-to-user protocol to the group setting, e.g., while keeping the OOB authenticated value short, might include a following naïve protocol: Have a sender choose a single random value $r_S$ and send each receiver a commitment to ($m_i$, $r_S$), wherein $m_i$ denotes a message for an ith receiver $R_i$, and $r_S$ denotes a random $\ell$-bit string. Each receiver $R_i$ may reply with a string $r_{R_i}$ to all other parties. The OOB authenticated value may then be $r_S \oplus r_{R_1} \oplus \ldots \oplus r_{R_k}$, and each receiver $R_i$ may accept the message $m_i$ if and only if the OOB authenticated value is consistent with his view of the protocol, e.g., if he determined a same OOB authenticated value as the sender.

Figure 3:
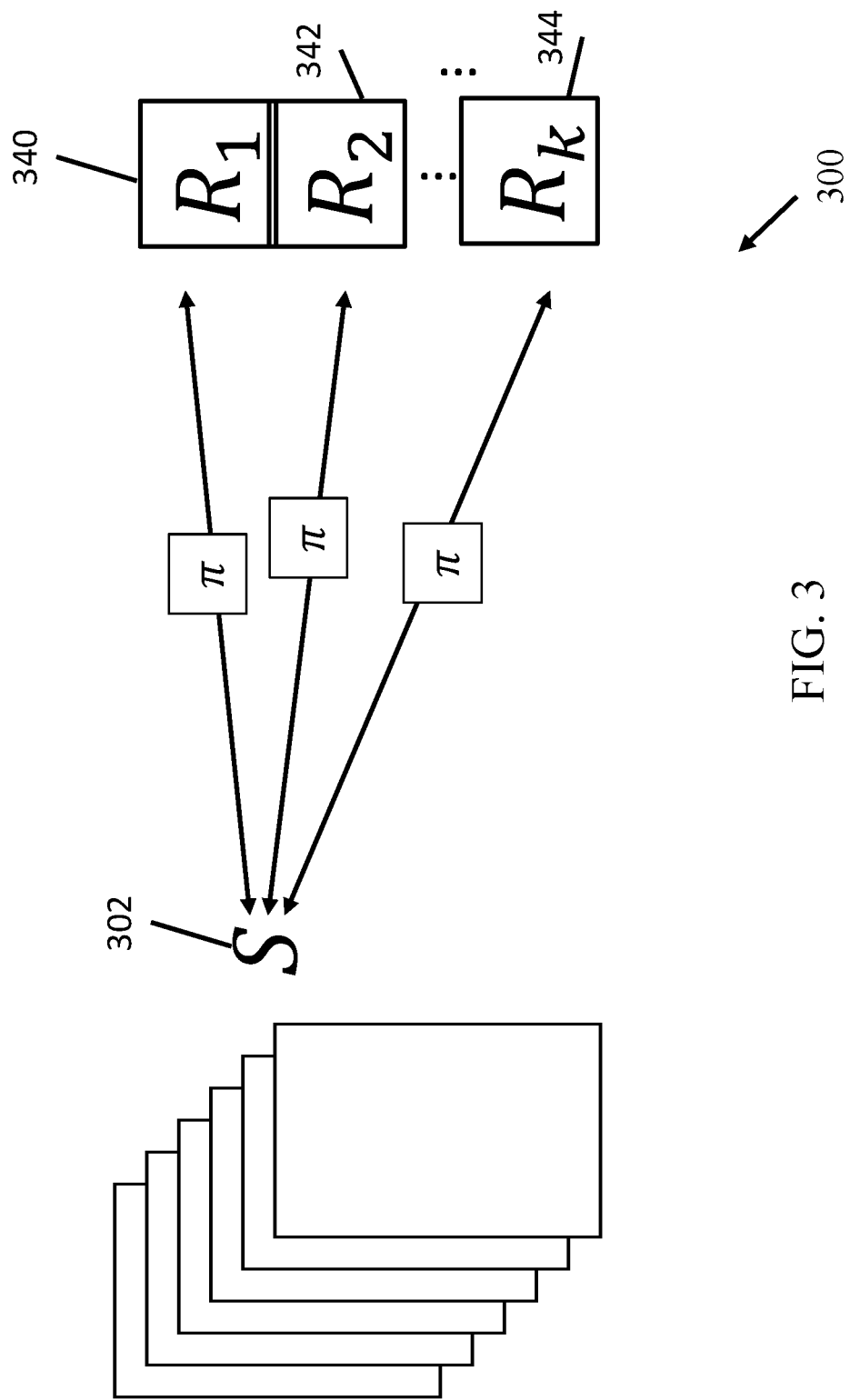
FIG. 3 is a schematic illustration of a naive protocol, according to an embodiment.

Reference is now made to FIG. 3, which is a schematic illustration of a naive and/or inefficient protocol 300.

As shown in FIG. 3, sender 302 may send a commitment to k receivers including receiver 340, receiver 342, and receiver 344. Receivers 340, 342, and 344 may each reply with a random string to all parties, e.g., receivers and sender. Sender 302 may reveal his commitment to receivers 340, 342, and 344, and each party may then calculate a XOR value based on the revealed commitment from sender 302 and the random strings from receivers 340, 342, and 344. The XOR value may be OOB authenticated.

In some embodiments, the naive protocol 300 does not enable a user to efficiently authenticate a message, for example, since the naive protocol may be completely unsecured, e.g., even when considering just one additional receiver $R_i$, for example, in a scheme with only two receivers.

For example, when implementing the naive protocol 300 in a scenario including a sender and two receivers $R_1$ and $R_2$, a message $m_1$ may be committed to receiver $R_1$ by $(m_1, r_S)$. However, instead of $(m_1, r_S)$, an attacker may send to $R_1$ a commitment to $(\widehat{m_1}, \hat{r_S})$ for a fraudulent and/or modified message $\widehat{m_1} \neq m_1$ and an arbitrary bit string $\hat{r_S}$. After learning $r_S$ and $r_{R_2}$, the attacker may simply send $R_1$ a value $\widehat{r_{R_2}} = r_{R_2} \oplus r_S \oplus \hat{r_S}$ instead of $r_{R_2}$. Since $r_S \oplus r_{R_2} = \hat{r_S} \oplus \widehat{r_{R_2}}$, an attack will go undetected and/or unnoticed, e.g., resulting in receiver $R_1$ accepting a fraudulent message $\widehat{m_1}$.

In some embodiments, unlike the naive protocol 300, the computationally-secure protocol of the present disclosure may be immune from this attack, for example, since the computationally-secure protocol may require receivers to avoid sending their random strings, e.g., in the clear. Instead, the receivers may only send commitments of their random strings at a beginning of the protocol, e.g., as described below.

Figure 4:
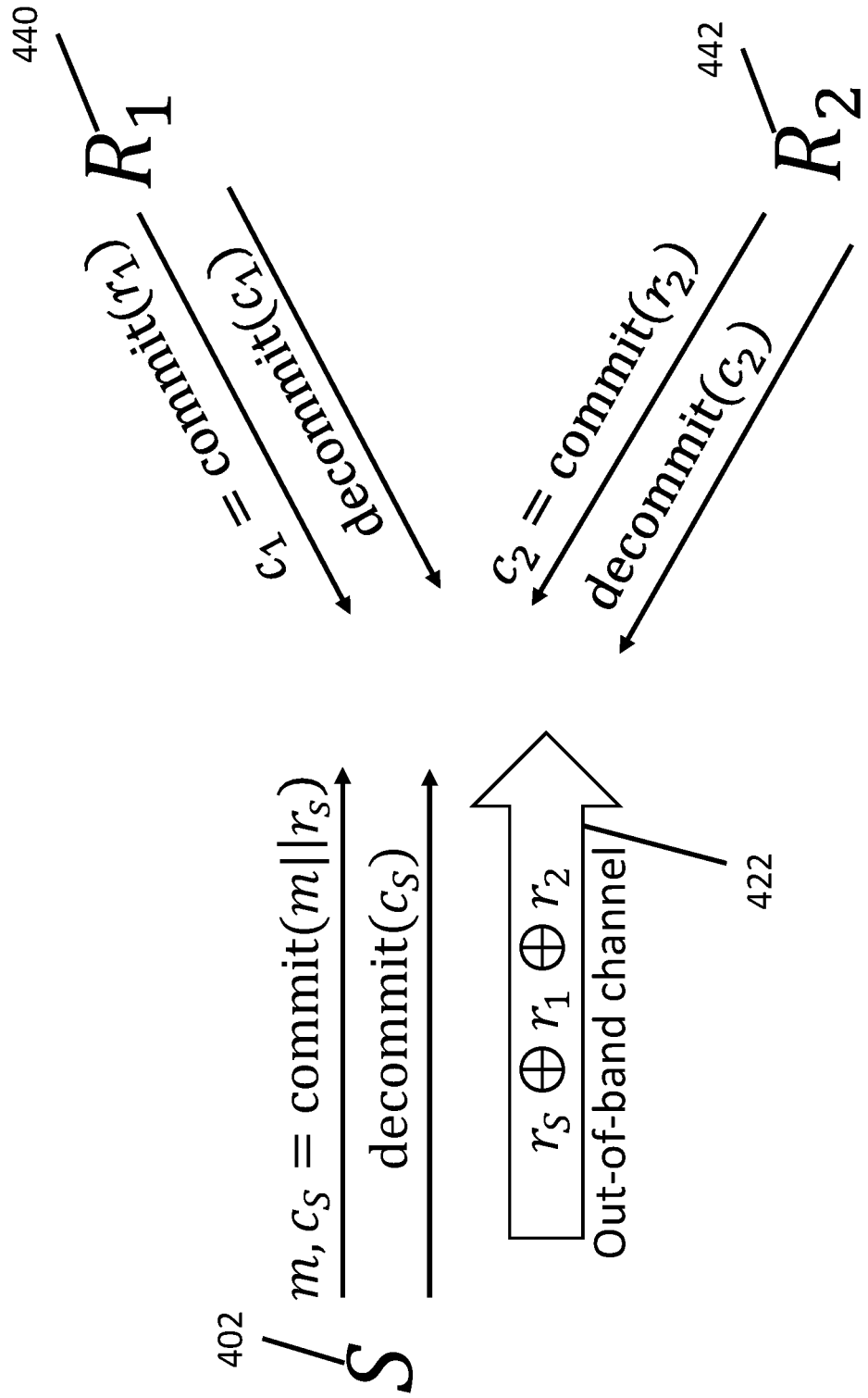
FIG. 4 is a schematic illustration of a group setting, according to an embodiment of the present invention.

Reference is now made to FIG. 4, which is a schematic illustration of computationally-secure protocol 500.

As shown in FIG. 4, computationally-secure protocol 400 starts with receivers 440 and 442 share with sender 402 and each other commitments of random strings $c_1$ and $c_2$, respectively. Sender 402 responds with a non-committed message m and with $c_s$, which includes a commitment of the message m and of a random string.

As shown in FIG. 4, each party then shares a key and/or a decommitment of its previous commitments, for example, to reveal all random strings. Specifically, receiver 440 shares a decommitment of $c_1$, receiver 442 shares a decommitment of $c_2$, and sender 402 shares a decommitment of $c_s$.

As shown in FIG. 4, computationally-secure protocol 400 ends with each party performing an OOB authenticating over an OOB channel 422 of a XOR value of all random strings.

In some embodiments, the additional commitments of each receiver, e.g., $c_1$ and $c_2$, in computationally-secure protocol 400 may prevent, e.g., efficiently, the attack of the naive protocol. However, there may be additional attacks to consider, e.g., since an attacker may have many possible ways to interleave its interactions with parties.

In some embodiments, it may be a challenging task to prove a security level of the computationally-secure protocol, for example, when taking into account the plurality of commitments in the computationally-secure protocol, and the many possible synchronizations an attacker may impose on the commitments in the group setting.

In some embodiments, a security calculation may prove that when a commitment scheme being used is concurrent and/or non-malleable, the computationally-secure protocol may be computationally secure. Specifically, setting $\ell = \log(1/\varepsilon) + \log k$ may guarantee that the attacker's forgery probability is at most $\varepsilon$.

In some embodiments, an attacker A who wishes to cause a receiver $R_i$ to accept a fraudulent and/or modified message, may have to choose between two options, e.g., as follows:

On the one hand, if attacker A delivers all the commitments, e.g., including $c_2$, and $c_s$, to S and to $R_i$ before $R_i$ reveals $r_{R_i}$, then $R_i$ accepting a fraudulent message implies breaking the concurrent non-malleability of the commitment scheme. Specifically, the 2 k commitments delivered to S and to $R_i$ by the attacker must define values whose exclusive-or (XOR) is equal to $r_{R_i} \oplus r_S$. These commitments thus satisfy a non-trivial relation which violates the concurrent non-malleability of the commitment scheme.

On the other hand, if $r_{R_i}$ is revealed before all commitments were delivered to S, then $r_S$ is chosen after all commitments were delivered to S and to $R_i$. Hence, all other values contributing to the authenticated value sent by S, and to the value $R_i$ is expecting to see as the OOB authenticated value, have already been determined, so the XOR of all relevant values guarantees that the probability of the chosen $r_S$ to result in equality is $2^{-\ell}$.

An in-depth description of the computationally-secure protocol, denoted $\pi_{comp}$, may be described using the following definitions:

Com=$(C_{Com}, R_{Com})$ may denote a concurrent and non-malleable commitment scheme that is statistically binding. The computationally-secure protocol, denoted $\pi_{comp}$, may be parameterized by a security parameter $\lambda \in \mathbb{N}$, by a number $k=k(\lambda)$ of receivers, by a length $\ell = \ell(\lambda)$ of the GOB authenticated value, and by a length $n=n(\lambda)$ of messages that a user would like to authenticate. A symbol $\perp$ may imply rejection of the message.

In some embodiments, the computationally-secure protocol may be defined, e.g., as follows:

1. for every $i \in [k]$ a receiver $R_i$ chooses a random $\ell$-bit string $r_i \leftarrow \{0,1\}^\ell$, and commits it to a sender S using Com. A resulting commitment according to the view of $R_i$ may be denoted by $c_i$, and commitments received by S may be denoted by $\hat{c}_i$.

2. for every $i \in [k]$ the sender S chooses a random string $r_s \leftarrow \{0,1\}^\ell$, and executes, e.g., in parallel, and/or one after another, k executions of Com to commit the message $(m_i, r_s)$ to the receiver $R_i$. The resulting commitments of the message $(m_i, r_s)$, as seen by the sender S may be denoted by $c_s^i$ for every $i \in [k]$, and the commitment received by $R_i$ may be denoted by $\hat{c}_s$.

the sender S may explicitly append following information to the first message it sends $R_i$ as part of the commitment: the message $m_i$, and received commitments $(\hat{c}_j)_{j \in [k] \setminus \{i\}}$ which may be received from the k receivers in step 1, and may be possibly tampered with message $m_i$. $\widehat{m}_i$ and $(\widehat{c_{j \to i}})_{j \in [k] \setminus \{i\}}$ may denote the message and the forwarded commitments as received by the receiver $R_i$, e.g., respectively.

3. for every $i \in [k]$ the receiver $R_i$ sends a decommitment $d_i$ of her commitment from step 1 to reveal $r_i$ to the sender S. $\hat{d}_i$ may denote the decommitment received by S from $R_i$. The sender S checks whether $\hat{d}_i$ is a valid decommitment to $\hat{c}_i$. If so, $\hat{r}_i$ may denote the committed value. Otherwise, the sender S may determine a fraud and accordingly send $\perp$ over an authenticated, e.g., OOB, channel, in which case all receivers output $\perp$ and terminate.

4. for every $i \in [k]$ the sender S sends every receiver $R_i$ a decommitment $d_s^i$ to the corresponding commitment from step 2 of the protocol, and reveals $r_s$ to each receiver $R_i$. $\widetilde{d_s^i}$ may denote the decommitment received by $R_i$. Every receiver $R_i$ checks if $\widetilde{d_s^i}$ is a valid decommitment to $\widehat{c_s^i}$. If it is, the committed value may be denoted by ($\widetilde{m_i^i}, \widetilde{r_s^i}$). If it is not a valid decommitment or if $\widetilde{m_i^i} \ne \widehat{m_i}$, e.g. where $\widehat{m_i}$ was received in step 2., then receiver $R_i$ may determine a fraud, output ⊥ an terminate.

the sender S also sends $R_i$ the decommitments $(\bar{d_j})_{j \in [k] \setminus [i]}$ she received in step 3, which may be possibly tampered with the decommitment $d_s^i$. $(\widetilde{d_{j \to i}})_{j \in [k] \setminus [i]}$ may denote the decommitments received by every $R_i$. If for some $j \in [k] \setminus \{i\}$ it holds that $\widetilde{d_{j \to i}}$ is not a valid decommitment to $\widehat{c_{j \to i}}$ received by $R_i$ is step 2., then $R_i$ may determine a fraud, output ⊥ and terminate. Otherwise, $(\widetilde{r_{j \to i}})_{j \in [k] \setminus [i]}$ may denote the values obtained by opening the commitments.

5. S computes $\sigma = r_s \oplus \widehat{r_1} \ldots \oplus \widehat{r_k}$ and sends $\sigma$ over the authenticated OOB channel. For every $i \in [k]$ the receiver $R_i$ computes $\widehat{\sigma_i} = \widetilde{r_s^i} \oplus \widetilde{r_{1 \to i}} \oplus \ldots \oplus \widetilde{r_{i-1 \to i}} \oplus r_i \oplus \widetilde{r_{i+1 \to i}} \oplus \ldots \widetilde{r_{k \to i}}$, and then, if $\widehat{\sigma_i} = \sigma$, outputs and/or authenticates $\widehat{m_i}$, e.g., as received in step 2, and otherwise determines a fraud, outputs ⊥ and terminates.

In some embodiments, the computationally-secure protocol, denoted $\pi_{Comp}$, may be computationally-secure according to a following theorem:

Let $k = k(\bullet)$, $\ell = \ell(\bullet)$, $r = r(\bullet)$ and $n = n(\bullet)$ be functions of the security parameter $\lambda \in \mathbb{N}$ and let Com be an r-round concurrent non-malleable commitment scheme. Then, protocol $\pi_{Comp}$ is a computationally-secure out-of-band (n, $\ell$, k, O(r), k·$2^{-\ell}$)-authentication protocol.

In some embodiments, protocol $\pi_{Comp}$ can be instantiated with Com being any concurrent non-malleable statistically-biding commitment scheme. The computationally-secure protocol may also be instantiated as a constant-round protocol, e.g., assuming only the existence of one-way functions. This assumption may be minimal and/or necessary, e.g., at least since even in the user-to-user setting, any computationally-secure GOB authentication protocol for which $\ell < 2 \log 1/\varepsilon - \Theta(1)$ implies an existence of one-way functions.

In some embodiments, a non-interactive concurrent non-malleable statistically-binding commitment scheme may be very efficiently constructed in a cryptographic hash function, e.g., a random oracle. Thus, instantiating $\pi_{Comp}$ with the random oracle may yield a highly efficient protocol.

In some embodiments, given a random oracle H, in order to commit to a value v, it may be required to send c=H(v,r) for a sufficiently long random string r.

In some embodiments, decommitment may be done by revealing v and r, while the receiver may assert that c=H(v, r).

In some embodiments, (A, D) may denote a pair of poly-query algorithms where A is an attacker, e.g., an MTIM attacker, and D is a distinguisher. It may be assumed that H is sufficiently length-increasing, e.g., length-doubling, so that it is difficult to find an element y in its image without querying H on a pre-image of y.

Accordingly, the algorithm A that receives c=H(v,r) and produces $c_1 = H(v_1, r_1), \ldots, c_k = H(v_k, r_k)$, knows $v_1, \ldots, v_k$ with overwhelming probability. Hence, it can distinguish between a case that c=H(v,r), and a case that c=H(v', r') where the value v', e.g., when taken together with $v_1, \ldots, v_k$ and the view of A, does not satisfy a polynomial time relation defined by the distinguisher D. By a standard argument, this is hard for any attacker making a polynomial number of queries to the random oracle.

In some embodiments, non-malleable commitment schemes also exist in the common reference string (CRS) model. However, a trusted CRS may be somewhat incompatible with an ad-hoc nature of instant messaging platforms and applications.

In some embodiments, a statistically-secure protocol of the present disclosure may extent and/or enhance a second user-to-user protocol, e.g., as described below.

In some embodiments, in the second user-to-user protocol, a sender and/or a receiver may maintain a joint sequence of values with a decreasing length, e.g., starting with an input, e.g., a message to be sent by the sender, and ending with the GOB authenticated value. In each round, users apply to a current value a hash function that may be chosen, e.g., cooperatively, by both users. Specifically, half of a randomness for choosing the hash function may be determined by the sender, and another half may be determined by the receiver.

In some embodiments, when generalizing the second user-to-user protocol to implement the group setting, a naive protocol may include independently executing the second user-to-user protocol for each receiver. However, this naive protocol may result in an increasement in the length of the OOB authenticated value.

In some embodiments, the statistically-secure protocol of the present disclosure may enable to minimize and/or cut a length of the OOB authenticated value, e.g., roughly by half, for example, at least when compared to the naive protocol.

In some embodiments, the statistically-secure protocol may start with the sender contributing a same randomness for all k hash functions, e.g., before sending the OOB authenticated value in a last round. Specifically, if the sender contributes a same randomness for all k hash functions, then all k executions may be tied together in a way that may permit a significant reduction in a number of bits that are authenticated out-of-band.

In some embodiments, the statistically-secure protocol may be based on an observation that k executions of the second user-to-user protocol, e.g., with each receiver, do not need to be completely independent from each other.

In some embodiments, the statistically-secure protocol may provide an essentially optimal tradeoff between the length of the GOB authenticated value and its security.

In some embodiments, an in-depth description of the statistically-secure protocol, denoted $\pi_{Stat}$, may be described using definitions, e.g., as follows:

In some embodiments, the statistically-secure protocol, denoted $\pi_{Stat}$, may be parametrized by a maximal forgery probability $\varepsilon \in (0,1)$, integers n, $k \in \mathbb{N}$ denoting a length of each message and a number of receivers, respectively, and an odd integer $r \in \mathbb{N}$ denoting a number of rounds. A Galois field with q elements may be denoted by GF(q). A message m of length n can be parsed as a polynomial of degree at most $\lceil n/\log q \rceil$ over GF(q). Namely, a message $m = m_1, \ldots, m_t \in GF(q)^t$ may define a polynomial in the following manner: for every $x \in GF(q)$, let $m(x) = \Sigma_{i=1}^{t} m_i \cdot x^i$. Then, for two distinct messages m, $\hat{m} \in GF(q)^t$ and any two field elements $y, \hat{y} \in GF(q)$, it holds that the polynomials $m(\bullet) + y$ and $\hat{m}(\bullet) + \hat{y}$ are distinct and thus $$Pr_{x \leftarrow GF(q)}[m(x) + y = \hat{m}(x) + \hat{y}] \le \frac{t}{q}.$$

Let $\varepsilon'=\varepsilon/k$, and $n_1=n$. For every $j\in[r-1]$, let $q_j$ denote a prime number chosen in a deterministic manner and/or any other agreed upon manner in an interval $$\left[\frac{2^{r-j}\cdot n_j}{\varepsilon'}, \frac{2^{r-j+1}\cdot n_j}{\varepsilon'}\right),$$

and let $n_{j+1}=\lceil 2\log q_j\rceil$.

In some embodiments, the statistically-secure protocol, denoted $\pi_{Stat}$, may be defined, e.g., as follows:

1. For every $i\in[k]$, S sends $m_{S,i}^1 = m_i$ to $R_i$. $m_{R_i}^1$ may denote the string received by $R_i$.
2. For $j=1$ to $r-2$:
   (a) If $j$ is odd, then for every $i\in[k]$:
     i. S chooses $y_i^j \leftarrow GF(q_j)$ and sends it to $R_i$.
     ii. $R_i$ receives $\widetilde{y_i^j}$, chooses $x_i^j \leftarrow GF(q_j)$ and sends it to S.
     iii. S receives $\widetilde{x_i^j}$ and computes $m_{S,i}^{j+1}=\widetilde{x_i^j}\|m_{S,i}^j(\widetilde{x_i^j})+y_i^j$.
     iv. $R_i$ computes $m_{R_i}^{j+1}=x_i^j\|m_{R_i}^j(x_i^j)+\widetilde{y_i^j}$.
   (b) if $j$ is even, then for every $i\in[k]$:
     i. $R_i$ chooses $y_i^j \leftarrow GF(q_j)$ and sends it to S.
     ii. S receives $\widetilde{y_i^j}$, chooses $x_i^j \leftarrow GF(q_j)$ and sends it to $R_i$.
     iii. $R_i$ receives $\widetilde{x_i^j}$ and computes $m_{R_i}^{j+1}=\widetilde{x_i^j}\|m_{R_i}^j(\widetilde{x_i^j})+y_i^j$.
     iv. S computes $m_{S,i}^{j+1}=x_i^j\|m_{S,i}^j(x_i^j)+\widetilde{y_i^j}$.
3. For every $i\in[k]$, $R_i$ chooses $y_i^{r-1}\leftarrow GF(q_j)$ and sends it to S.
4. S receives $\widetilde{y_1^{r-1}},\ldots,\widetilde{y_k^{r-1}}$, chooses $x^{r-1}\leftarrow GF(q_{r-1})$, and for every $i\in[k]$ sends $x_i^{r-1}=x^{r-1}$ to $R_i$.
5. For every $i\in[k]$, $R_i$ receives $\widetilde{x_i^{r-1}}$ and computes $\widehat{\sigma}_i=m_{R_i}^{r-1}(\widetilde{x_i^{r-1}})+y_i^{r-1}$. $m_{R_i}^r$ may denote $\widetilde{x_i^{r-1}}\|\widehat{\sigma}_i$.
6. For every $i\in[k]$, S computes $\sigma_i=m_{S,i}^{r-1}(x^{r-1})+\widetilde{y_i^{r-1}}$. $m_{S,i}^r$ may denote $x^{r-1}\|\sigma_i$. S sends $x^{r-1}\|\sigma_1\|\ldots\|\sigma_k$ over the authenticated, e.g., OOB channel.
7. For every $i\in[k]$, if $m_{S,i}^r = m_{R_i}^r$, i.e., if $x^{r-1}=\widetilde{x_i^{r-1}}$ and $\sigma_i=\widehat{\sigma}_i$, $R_i$ outputs $m_{R_i}^1$.

Otherwise, $R_i$ outputs $\perp$ and terminates.

In some embodiments, the statistically-secure protocol, denoted $\pi_{Stat}$, may be statistically-secure according to a following theorem, e.g., when $\pi_{Stat}$ is invoked with at least $\log^* n$ rounds:

Let $n, k\in\mathbb{N}$, let $r\geq 3$, and let $\varepsilon\in(0,1)$. Then, protocol $\pi_{Stat}$ is a statistically-secure out-of-band $(n, \ell, k, r, \varepsilon)$-authentication protocol, where $$\ell = (k+1)\cdot\left(\log\frac{1}{\varepsilon}+\log k+\log^{(r-1)}n+O(1)\right).$$

In some embodiments, a communication model of the group messaging authentication protocol may be formally specified, e.g., as described below.

In some embodiments, the group messaging authentication protocol may include parties connected via two types of communication channels: unsecured and/or unauthenticated channels and an authenticated low-bandwidth channel.

In some embodiments, a sender and receivers of the group messaging platform may send multiple messages over the OOB authenticated channel throughout the protocol. However, this will not be necessary in the group messaging authentication protocol. Furthermore, lower bounds of the group messaging authentication protocol readily capture this more general case as well, e.g., by providing a lower bound on a total number of bits sent over the authenticated, e.g., OOB, channel throughout the group messaging authentication protocol.

In some embodiments, the unsecured and/or unauthenticated channels may be vulnerable to MTIM attacks, and the attacker may be assumed to have complete control over them. In particular, this provides the attacker with considerable control over a synchronization of the group messaging authentication protocol's execution. Nonetheless, the execution may still be guaranteed to be marginally synchronized, e.g., wherein each party sends her messages in the ith round of the group messaging authentication protocol only upon receiving all due messages of round i−1.

In some embodiments, a topology of the unsecured channels may include various possible networks, e.g., including at least the following and/or any combination thereof:

A star network model: in this model each receiver $R_i$ is connected to the sender S via a bidirectional unsecured channel. In particular, the receivers cannot send messages directly to each other, and any communication among them must pass through the sender S.

A complete network model: In this model every pair of parties, e.g., sender and receiver and/or two receivers, may be connected through an unsecured channel.

In some embodiments, a performance of both computational and statistical protocols may be compared, e.g., as described below.

In some embodiments, a comparison may be made between results of the computationally-secure protocol and the statistically-secure protocol, e.g., based on a number of bits the sender has to OOB authenticate in each protocol and/or a length of an OOB authenticated value.

In some embodiments, for both the computationally-secure protocol and the statistically-secure protocol, a corresponding lower bound and the number of bits to be OOB authenticates may indicate whether the protocol has a best possible tradeoff between the length of the OOB authenticated value and the attacker's success probability.

In some embodiments, results of the computationally-secure protocol and the statistically-secure protocol may be, e.g., as follows in table 1:

TABLE 1

| | Protocol | Lower Bound |
|---|---|---|
| Computational Security | $\log(1/\varepsilon) + \log k$ | $\log(1/\varepsilon) + \log k - \Theta(1)$ |
| Statistical Security | $(k+1)\cdot(\log(1/\varepsilon) + \log k + \Theta(1))$ | $(k+1)\cdot\log(1/\varepsilon) - k$ | wherein k denoted a number of receivers, and $\varepsilon$ denotes an attacker's forgery and/or cheating probability.

In some embodiments, the computationally-secure protocol may rely on an existence of any one-way function, whereas the statistically-secure protocol and lower bounds of both protocols do not rely on any computational assumptions.

In some embodiments, an upper bound and/or a lower bound on the length of the OOB authenticated value in the computationally-secure protocol may match, e.g., within an additive constant term.

In some embodiments, an upper bound and/or a lower bound on the length of the OOB authenticated value in the statistically-secure protocol may match within a non-constant, e.g., an additive term $(k+1)\log k+\Theta(k)$. However, whenever $\varepsilon=O(1/k)$, as may be typically expected when setting a bound on the attacker's forgery probability, this difference becomes a lower-order term.

In some embodiments, there may exist a significant gap between a length of the OOB authenticated value in both protocols. Specifically, in the statistically-secure protocol, a lower bound depends, e.g., linearly, on a size of the group, while in the computationally-secure protocol a length of the OOB authenticated value depends very weakly on the size of the group.

In some embodiments, the group messaging authentication protocol described herein may yield an efficient and/or practically-relevant protocol, for example, when instantiating and/or implementing its cryptographic building block and/or primitives, e.g., which may include a concurrent non-malleable commitment scheme in a random-oracle model and/or in any one-way function in a standard model.

In some embodiments, results of the computationally-secure protocol and the statistically-secure protocol may be compared to results of naive and/or inefficient protocols, e.g., as described below.

In some embodiments, a naive and/or inefficient approach to constructing an authentication protocol in the group setting may include relying on any such protocol in the user-to-user setting, e.g., by simply utilizing the same protocol multiple time. For example, given one sender and k receivers, the naive approach may include invoking a user-to-user protocol between the sender and each of the receivers, e.g., independently.

In some embodiments, when implementing the naive and/or inefficient approach, if a length of the OOB authenticated value in the underlying user-to-user protocol may include $\ell(\varepsilon)$ bits, e.g., where $\varepsilon$ is the attacker's forgery probability, then a length of the OOB authenticated value in an entire group may include $k \cdot \ell(\varepsilon/k)$ bits. Thus, the naive approach may yield OOB authenticated values whose length is linear to the size of the group.

In some embodiments, since user-to-user protocols, e.g., the first and second user-to-user protocols, may have OOB authenticated values of lengths $\ell(\varepsilon)=\log(1/\varepsilon)$ and $$\ell(\varepsilon) = 2\log\left(\frac{1}{\varepsilon}\right) + \Theta(1),$$

respectively, instantiating the naive approach with multiple user-to-user protocols may yield protocols wherein the sender must OOB authenticate $k \cdot (\log(1/\varepsilon) + \log k)$ bits and $2k \cdot (\log(1/\varepsilon) + \log k + \Theta(1))$ bits, respectively.

In some embodiments, the present disclosure, e.g., as shown in Table 1, may exhibit completely different behaviors than the naive approach. For example, the computationally-secure protocol may have better, e.g., dramatically better, performances at least compared to the naive approach, e.g., as described below.

In some embodiments, implementing the computationally-secure protocol of the present disclosure may enable to completely eliminate a linear dependency on the size of the group.

In some embodiments, with regard to the statistical setting, the naive approach may be asymptotically optimal, but may still be improved, e.g., substantially, by implementing the statistically-secure protocol of the present disclosure, for example, which may implement a multiplicative constant factor.

Notions of Security

In some embodiments, security and/or correctness requirements may be defined for authentication protocols of a group setting. Authentication protocols may include an input to the sender S which may be chosen by the attacker, e.g., including a vector of message $m_1, \ldots, m_k$. At an end of an execution, each receiver $R_i$ outputs either a received message $\widehat{m}_i$ or the unique symbol $\bot$, implying rejection.

In some embodiments, correctness of an authentication protocol states that in an honest execution, with high probability all receivers output the correct message; i.e., $\widehat{m}_i = m_i$ for every $i \in [k]$.

In some embodiments, security of an authentication protocol requires that an attacker, e.g., which may be efficient in the computational setting and unbounded in the statistical setting, cannot convince a receiver to output an incorrect message, i.e., the probability that $\widehat{m}_i \notin \{m_i, \bot\}$ is bounded by a pre-specified parameter.

A formal definition of security and/or correctness requirements in the statistical setting may include, e.g., the following:

A statistically-secure out-of-band (n, $\ell$, k, r, E)-authentication protocol is a (k+1)-party r-round protocol in which the sender S is invoked on a k-tuple of n-bit messages, and sends at most $\ell$ bits over the authenticated out-of-band channel. The following requirements must hold:
   Correctness: In an honest execution of the protocol, for all input messages $m_1, \ldots, m_k \in \{0,1\}^n$ to S and for every $i \in [k]$, receiver $R_i$ outputs $m_i$ with a probability of 1.
   Unforgeability: For any attacker and for every adversarially-chosen input messages $m_1, \ldots, m_k$ on which S is invoked, a probability that there exists some $i \in [k]$ for which receiver $R_i$ outputs some message $\widehat{m}_i \notin \{m_i, \bot\}$ is at most $\varepsilon$.

In some embodiments, this definition may be applied to the complete network model, the star network model, and/or any other communication model.

A formal definition of security and/or correctness requirements in the computational setting may be defined similarly to the statistical setting, except that here the security need only hold against efficient adversaries and/or attackers, and the probability of forgery is also allowed to additively grow by a negligible function of the security parameter $\lambda \in \mathbb{N}$, e.g., as follows:

Let $n=n(\lambda)$, $\ell=\ell(\lambda)$, $k=k(\lambda)$, $r=r(\lambda)$ and $\varepsilon=\varepsilon(\lambda)$ he functions of the security parameter $\lambda \in \mathbb{N}$ A computationally-secure out-of-hand (n, $\ell$, k, r, $\varepsilon$)-authentication protocol is a (k+1)-party r-round protocol in which the sender S is invoked on a k-tuple of n-hit messages, and sends at most $\ell$ hits oxer the authenticated out-of-hand channel. The following requirements must hold:
   Correctness: In an honest execution of the protocol, for all input messages $m_1, \ldots, m_k \in \{0,1\}^n$ to S and for every $i \in [k]$, receiver $R_i$ outputs $m_i$ with probability 1.
   Unforgeability: Tor any probabilistic polynomial-time attacker there exists a negligible function $v=v(\cdot)$ such that the following holds: For every input messages my, chosen by the attacker and on which S is invoked, the probability that there exists some $i \in [k]$ for which receiver outputs some message $\widehat{m}_i \notin \{m_i, \bot\}$ is at most $\varepsilon + v(\lambda)$ for all sufficiently large $\lambda \in \mathbb{N}$.

Non-Malleable Commitment Schemes

In some embodiments, constant-round concurrent and/or non-malleable commitment schemes to be implemented in the group messaging authentication protocol may be constructed from any one-way function, for example, with a random-oracle model which may be highly efficient.

In some embodiments, a one-to-many concurrent non-malleable commitment scheme may have a following guarantee: any efficient attacker cannot use a commitment to a value v in order to produce commitments to values $\widehat{v}_1, \ldots, \widehat{v}_k$ that are non-trivially related to v.

In some embodiments, only addressing a one-to-many setting, for example, which includes a message from one sender to may receivers, e.g., may be useful for simplicity and since the one-to-many setting is equivalent to a general many-many setting.

In other embodiments, any other setting may be addressed.

More formally, let Com=(C, R) be a statistically-binding commitment scheme, and let k=k(•) be a function of a security parameter $\lambda \in \mathbb{N}$, bounded by some polynomial. An efficient attacker A gets an auxiliary and/or OOB input $z \in \{0,1\}^*$, e.g., in addition to the security parameter. Attacker A may participate in an MTIM attack, e.g., as follows:

A may take a part in a single left interaction and k right interactions, e.g., as described below.

In the left interaction, A may interact with a committer C, and receive a commitment to a value v. A resulting commitment, e.g., including a transcript of the left interaction, may be denoted by c.

In each right interaction, A may interact with a receiver R, resulting all together in k commitments $\hat{c}_1, \ldots, \hat{c}_k$. k related values $\hat{v}_1, \ldots, \hat{v}_k$ may be defined in a following manner: for every $i \in [k]$, if $\hat{c}_i = c$, if $\hat{c}_i$ is not a valid commitment, or if $\hat{c}_i$ can be opened to more than one value, then $\hat{v}_i = \bot$. A statistical binding property of Com may ensure that the latter case can only happen with a negligible probability. Otherwise, $\hat{v}_i$ is a unique value to which $\hat{c}_i$ may be opened. Let $\text{mim}_{Com}^A(v,z)$ denote random variable that include the values $\hat{v}_1, \ldots, \hat{v}_k$ and A's view at an end of the experiment.

An advantage of (A, D), wherein A and D are a pair of algorithms, with respect to security parameter $\lambda \in \mathbb{N}$ may be defined, e.g., as follows:

$$Adv_{Com}^{A,D}(\lambda) \stackrel{def}{=} \max_{v,v' \in \{0,1\}^\lambda} \{Pr[D(1^\lambda, \text{mim}_{Com}^A(v, z)) = 1] - \quad (4)$$

$$Pr[D(1^\lambda, \text{mim}_{Com}^A(v', z)) = 1]\}$$

In some embodiments, a statistically-binding commitment scheme may be considered concurrent and non-malleable, e.g., if for any pair of probabilistic polynomial-time algorithms (A, D) there exists a negligible function $v=v(\cdot)$ such that $Adv_{Com}^{A,D}(\lambda) \leq v(\lambda)$ for all sufficiently large $\lambda \in \mathbb{N}$.

Computational Security Example

In some embodiments, a possible instantiation of the computationally-secure protocol when used to OOB authenticate a transcript of a group key-exchange protocol may be described below.

In some embodiments, G may be a group of prime order q that is generated by $g \in G$. A group key-exchange protocol for a group consisting of k+1 parties, denoted S and $R_1, \ldots, R_k$, may be defined, e.g., as follows:

1. For every $i \in [k]$, $R_i$ chooses a random $b_i \leftarrow \mathbb{Z}_q$, computes $B_i = g^{b_i}$ and sends $B_i$ to S.

2. S chooses a random $a \leftarrow \mathbb{Z}_q$, and for every $i \in [k]$ computes $D_i = B_i^a$, and sends $D_i$ to $R_i$.

3. The joint group key is then $K = g^a$. S knows a and can compute K directly, while each $R_i$ knows $b_i$ and can compute $$K = D_i^{b_i^{-1}} = (g^{ab_i})^{b_i^{-1}} = g^a.$$

In some embodiments, a security of the group key-exchange protocol in the presence of an eavesdropper follows easily from a decisional Diffie-Hellman (DDH) assumption. However, an MTIM attacker is capable of devastating attacks.

In some embodiments, the computationally-secure protocol may be utilized and/or implemented to overcome the attack. A group may employ the computationally-secure protocol on top of the above key-exchange protocol, for example, in order to immune it from MTIM attacks.

In the example below, the commitment scheme used in the computationally-secure protocol was instantiated via any cryptographic hash function H, e.g., SHA-2. As discussed above, security is guaranteed when H is modeled as a random oracle.

In some embodiments, the computationally-secure protocol may have a following form when combined with the key-exchange protocol:

1. For every $i \in [k]$, $R_i$ randomly chooses $b_i \leftarrow \mathbb{Z}_q$ and computes $B_i = g^{b_i}$. $R_i$ also chooses $r_i \leftarrow \{0,1\}^\ell$ and $s_i \leftarrow \{0,1\}^\lambda$ uniformly at random and computes $c_i = H(r_i \| s_i)$. $R_i$ sends $(B_i, c_i)$ to S; $R_i$ also sends $c_i$ to all other receivers. Values received by S may be denoted by $(\hat{B}_i, \hat{c}_i)$ and the value received by receiver $R_j$ may be denoted by $\widehat{c_{i \to j}}$ for every $j \in [k] \setminus \{i\}$.

2. S chooses a random $a \leftarrow \mathbb{Z}_q$ and for every $i \in [k]$ computes $D_i = \hat{B}_i^a$. $m_i$ may be denoted by $(\hat{B}_i, \hat{c}_i, D_i)$. S then chooses $r_S \leftarrow \{0,1\}^\ell$ and for every $i \in [k]$, she chooses a random $s_S^i \leftarrow \{0,1\}^\lambda$ and computes $c_S^i = H(m_i \| r_S \| s_S^i)$. S sends $(D_i, c_S^i)$ to $R_i$. The values received may be denoted by $R_i$ by $(\hat{D}_i, \hat{c}_S^i)$ and $\widehat{m_i}$ may be denoted by $(B_i, c_i, \hat{D}_i)$.

3. For every $i \in [k]$, $R_i$ sends $r_i$ and $s_i$ to all other parties. The values received by S may be denoted by $(\hat{r}_i, \hat{s}_i)$ and the values received by $R_j$ may be denoted by $(\widehat{r_{i \to j}}, \widehat{s_{i \to j}})$ for every $j \in [k] \setminus \{i\}$. S verifies that $\hat{c}_i = H(\hat{r}_i \| \hat{s}_i)$ and each $R_j$ for every $j \in [k] \setminus \{i\}$ verifies that $\widehat{c_{i \to j}} = H(\widehat{r_{i \to j}}, \widehat{s_{i \to j}})$. If the verification by a certain party fails, that party outputs $\bot$ and terminates.

4. S sends $(r_S, s_S^i)$ to receiver $R_i$, for every $i \in [k]$. The values received by $R_i$ may be denoted by $(\hat{r}_S^i, \hat{s}_S^i)$. Each $R_i$ then verifies that $\hat{c}_S^i = H(\widehat{m_i} \| \hat{r}_S^i \| \hat{s}_S^i)$. If the verification by a certain party fails, that party outputs $\bot$ and terminates.

5. S computes $\sigma = r_S \oplus \hat{r}_1 \oplus \ldots \oplus \hat{r}_k$ and sends $\sigma$ over the out-of-band authenticated channel, and outputs $g^a$. For every $i \in [k]$, $R_i$ verifies that $\sigma$ is consistent with her view of the protocol. If so, $R_i$ outputs $$\hat{D}_i^{b_i^{-1}}$$

Otherwise, $R_i$ outputs $\bot$ and terminates.

Definitions

For a distribution X, $x \leftarrow X$ may denote a process of sampling a value x from the distribution X.

For a set $\mathcal{X}$, $x \leftarrow \mathcal{X}$ may denote a process of sampling a value x from a uniform distribution over $\mathcal{X}$.

For an integer $n \in \mathbb{N}$, [n] may denote a set $\{1, \ldots, n\}$.

A function $v: \mathbb{N} \to \mathbb{R}^+$ may be negligible if for any polynomial $p(\cdot)$ there exists an integer N such that for all n>N it holds that $v(n) \leq 1/p(n)$.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
sending over a first communication channel:
(i) by each of two or more receiver computing devices, to all other said receiver computing devices and to a sender computing device, an encrypted receiver bit string associated with the sending receiver computing device,
(ii) by said sender computing device, to each of said receiver computing devices, an encrypted communication comprising: a sender bit string, and a message payload,
(iii) by each of said receiver computing devices, to all other said receiver computing devices and to said sender computing device, a decrypted version of said receiver bit string, and
(iv) by said sender computing device, to all said receiver computing devices, a decrypted version of said communication;
sending over a second communication channel:
(v) by said sender computing device, a result of a first exclusive or (XOR) of said sender bit string and all said receiver bit strings;
calculating, by each of said receiver computing devices, a result of a second XOR of said sender bit string and all said receiver bit strings; and
comparing, by each of said receiver computing devices, said first and second XORs, to authenticate said message payload.

2. The method of claim 1, wherein said authenticating comprises verifying that said message payload was not modified during said sending of said encrypted communication by said sender computing device over said first communication channel.

3. The method of claim 1, wherein said at least some of said sender bit string and receiver bit strings are randomly generated bit strings.

4. The method of claim 1, wherein said encryption is performed using a cryptographic hash function.

5. The method of claim 1, wherein said second communication channel is an authenticated channel.

6. The method of claim 1, wherein said second communication channel is one of a voice channel, a data channel, a visual channel, and an auditory channel.

7. The method of claim 1, wherein said second communication channel is a unidirectional channel only between said sender device and each of said receiver devices.

8. A system comprising:
at least three computing devices, each comprising at least one hardware processor and a non-transitory computer-readable storage medium having stored thereon program instructions, the program instructions executable by the at least one hardware processor to operate each of said at least three computing devices to:
send over a first communication channel:
(i) by each of two or more receiver computing devices selected from said at least three computing devices, to (a) all other said receiver computing devices, and (b) to a sender computing device selected from said at least three computing devices, an encrypted receiver bit string associated with the sending receiver computing device,
(ii) by said sender computing device, to each of said receiver computing devices, an encrypted communication comprising: a sender bit string, and a message payload,
(iii) by each of said receiver computing devices, to all other said receiver computing devices and to said sender computing device, a decrypted version of said receiver bit string, and
(iv) by said sender computing device, to all said receiver computing devices, a decrypted version of said communication;
send over a second communication channel:
(v) by said sender computing device, a result of a first exclusive or (XOR) of said sender bit string and all said receiver bit strings;
calculate, by each of said receiver computing devices, a result of a second XOR of said sender bit string and all said receiver bit strings; and
compare, by each of said receiver computing devices, said first and second XORs, to authenticate said message payload.

9. The system of claim 8, wherein said authenticating comprises verifying that said message payload was not modified during said sending of said encrypted communication by said sender computing device over said first communication channel.

10. The system of claim 8, wherein said at least some of said sender bit string and receiver bit strings are randomly generated bit strings.

11. The system of claim 8, wherein said encryption is performed using a cryptographic hash function.

12. The system of claim 8, wherein said second communication channel is an authenticated channel.

13. The system of claim 8, wherein said second communication channel is one of a voice channel, a data channel, a visual channel, and an auditory channel.

14. The system of claim 8, wherein said second communication channel is a unidirectional channel only between said sender device and each of said receiver devices.

15. A computer program product comprising a non-transitory computer-readable storage medium having program instructions embodied therewith, the program instructions executable by at least one hardware processor to operate each of at least three computing device to
send over a first communication channel:
(i) by each of two or more receiver computing devices selected from said at least three computing devices, to (a) all other said receiver computing devices, and (b) to a sender computing device selected from said at least three computing devices, an encrypted receiver bit string associated with the sending receiver computing device,
(ii) by said sender computing device, to each of said receiver computing devices, an encrypted communication comprising: a sender bit string, and a message payload,
(iii) by each of said receiver computing devices, to all other said receiver computing devices and to said sender computing device, a decrypted version of said receiver bit string, and
(iv) by said sender computing device, to all said receiver computing devices, a decrypted version of said communication;
send over a second communication channel:
(v) by said sender computing device, a result of a first exclusive or (XOR) of said sender bit string and all said receiver bit strings;

calculate, by each of said receiver computing devices, a result of a second XOR of said sender bit string and all said receiver bit strings; and compare, by each of said receiver computing devices, said first and second XORs, to authenticate said message payload.

16. The computer program product of claim 15, wherein said authenticating comprises verifying that said message payload was not modified during said sending of said encrypted communication by said sender computing device over said first communication channel.

17. The computer program product of claim 15, wherein said at least some of said sender bit string and receiver bit strings are randomly generated bit strings.

18. The computer program product of claim 15, wherein said encryption is performed using a cryptographic hash function.

19. The computer program product of claim 15, wherein said second communication channel is an authenticated channel.

20. The computer program product of claim 15, wherein said second communication channel is one of a voice channel, a data channel, a visual channel, and an auditory channel.

* * * * *